United States Patent [19]

Bober

[11] Patent Number: 5,625,518

[45] Date of Patent: Apr. 29, 1997

[54] CLAMPING CIRCUIT WITH REVERSE POLARITY PROTECTION

[75] Inventor: Gregory D. Bober, St. Clair Shores, Mich.

[73] Assignee: Ford Motor Company, Dearborn, Mich.

[21] Appl. No.: 567,396

[22] Filed: Dec. 4, 1995

[51] Int. Cl.⁶ .................................................. H02H 3/14
[52] U.S. Cl. ........................ 361/56; 307/127; 307/10.7; 361/84
[58] Field of Search ........................ 361/56, 18, 86, 361/88, 159, 4, 84; 307/10.7, 89–91, 127

[56] References Cited

U.S. PATENT DOCUMENTS

| 4,287,436 | 9/1981 | Tezuka et al. | 307/270 |
| 4,962,346 | 10/1990 | Maggioni et al. | 307/270 |
| 5,109,162 | 4/1992 | Koch et al. | 307/127 |
| 5,347,169 | 9/1994 | Preslar et al. | 307/246 |

FOREIGN PATENT DOCUMENTS

| 5757028 | 9/1980 | Japan . |
| 3141721 | 10/1989 | Japan . |

Primary Examiner—Jeffrey A. Gaffin
Assistant Examiner—Michael J. Sherry
Attorney, Agent, or Firm—Mark L. Mollon, Esq.; Roger L. May, Esq.

[57] ABSTRACT

A clamping circuit for protecting circuits operatively connected between a control circuit, a driving circuit, a power source, and an output circuit includes an inductive flyback circuit to add current to the output circuit through the driving circuit, and a reverse power protection circuit operatively connected between the inductive flyback circuit and the control circuit wherein the reverse power protection circuit opens the inductive flyback circuit and provides an electrical connection between the power source and the output circuit allowing current to flow through the output circuit when the power source is connected to the driving circuit incorrectly.

8 Claims, 2 Drawing Sheets

CLAMPING CIRCUIT WITH REVERSE POLARITY PROTECTION

BACKGROUND OF THE INVENTION

1. Field of the Invention

The present invention relates generally to clamping circuit and, more specifically, to a clamping circuit with reverse polarity protection devices for circuits using a removable direct current power source.

2. Description of the Related Art

When direct current power sources are removable from the circuits relying thereon for power source, the potential for incorrectly reconnecting the direct current power source to the circuit exists. In many instances where the direct current power source provides power to circuits which include processing capabilities, the potential for damage to those processing circuits exists. A way to prevent damage to these types of voltage sensitive circuits is to connect a reverse voltage blocking diode in line to prevent a reversed biased voltage from damaging what is beyond the voltage blocking diode. A disadvantage associated with the reverse voltage blocking diode is its consumption of power. The reverse voltage blocking diode consumes power, reduces voltage, generates heat, and only protects for brief moments in the life of the circuit (s) it protects.

SUMMARY OF THE INVENTION

Accordingly, a clamping circuit for protecting circuits operatively connected between a control circuit, a driving circuit, a power source, and an output is disclosed. The clamping circuit includes an inductive flyback circuit. The inductive flyback circuit adds current to a current receivable by the output circuit through the driving circuit. The clamping circuit further includes a reverse power protection circuit operatively connected between the inductive flyback circuit and the control circuit. The reverse power protection circuit opens the inductive flyback circuit when the power source is connected to the driving circuit incorrectly.

One advantage associated with the present invention is the ability to clamp inductive output load transients at the lowest possible voltage to reduce RFI. A second advantage associated with the present invention is the elimination of the reverse voltage blocking diode which reduces power to circuits insensitive to voltage bias and consumes power, and is only used briefly during the life of the circuit it is protecting.

Other advantages and features of the present invention will be readily appreciated as the same becomes better understood by reference to the subsequent description when considered in connection with the accompanying drawings.

DESCRIPTION OF THE PREFERRED EMBODIMENT(S)

Figure 1:
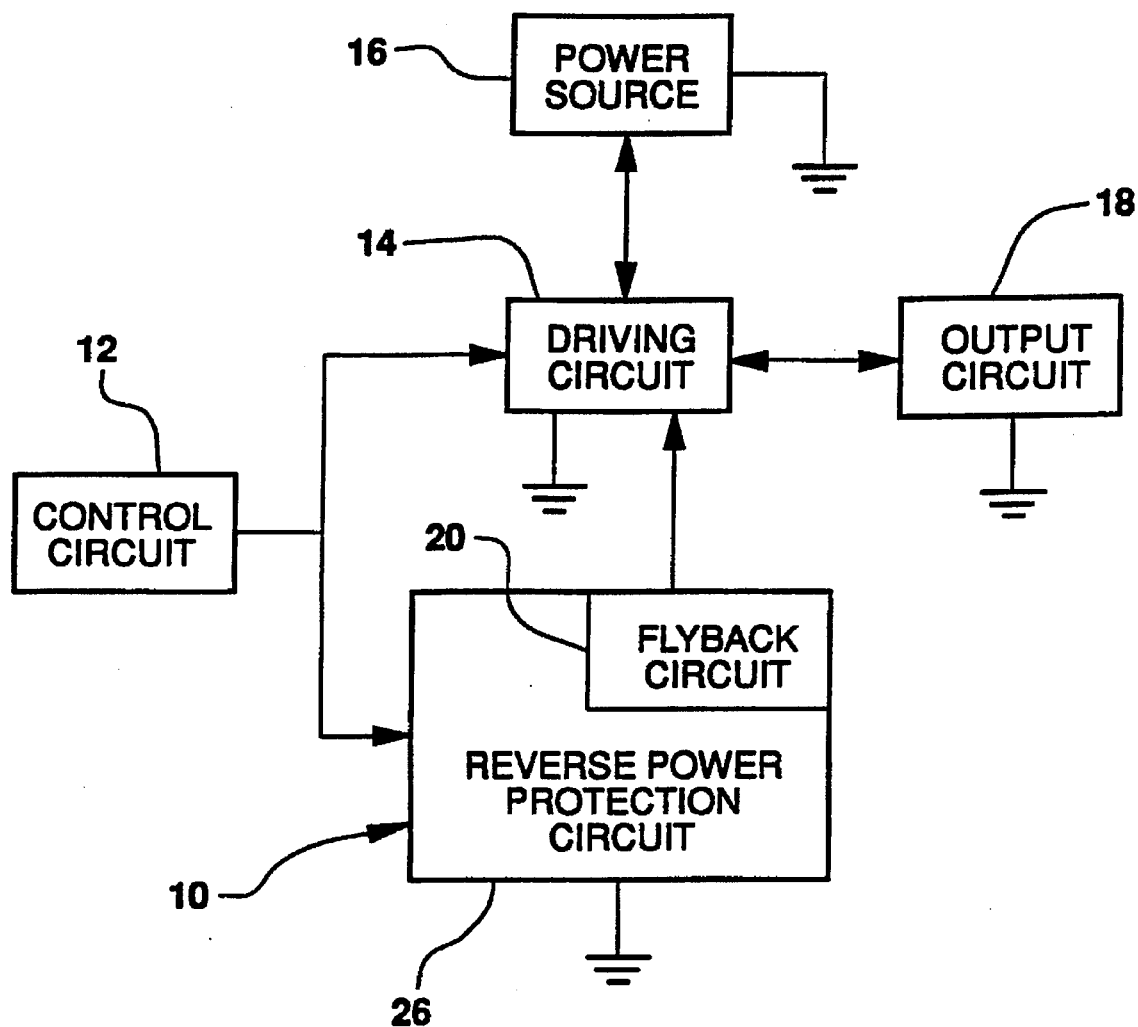
FIG. 1 is a block diagram of one embodiment of the present invention.
Figure 2:
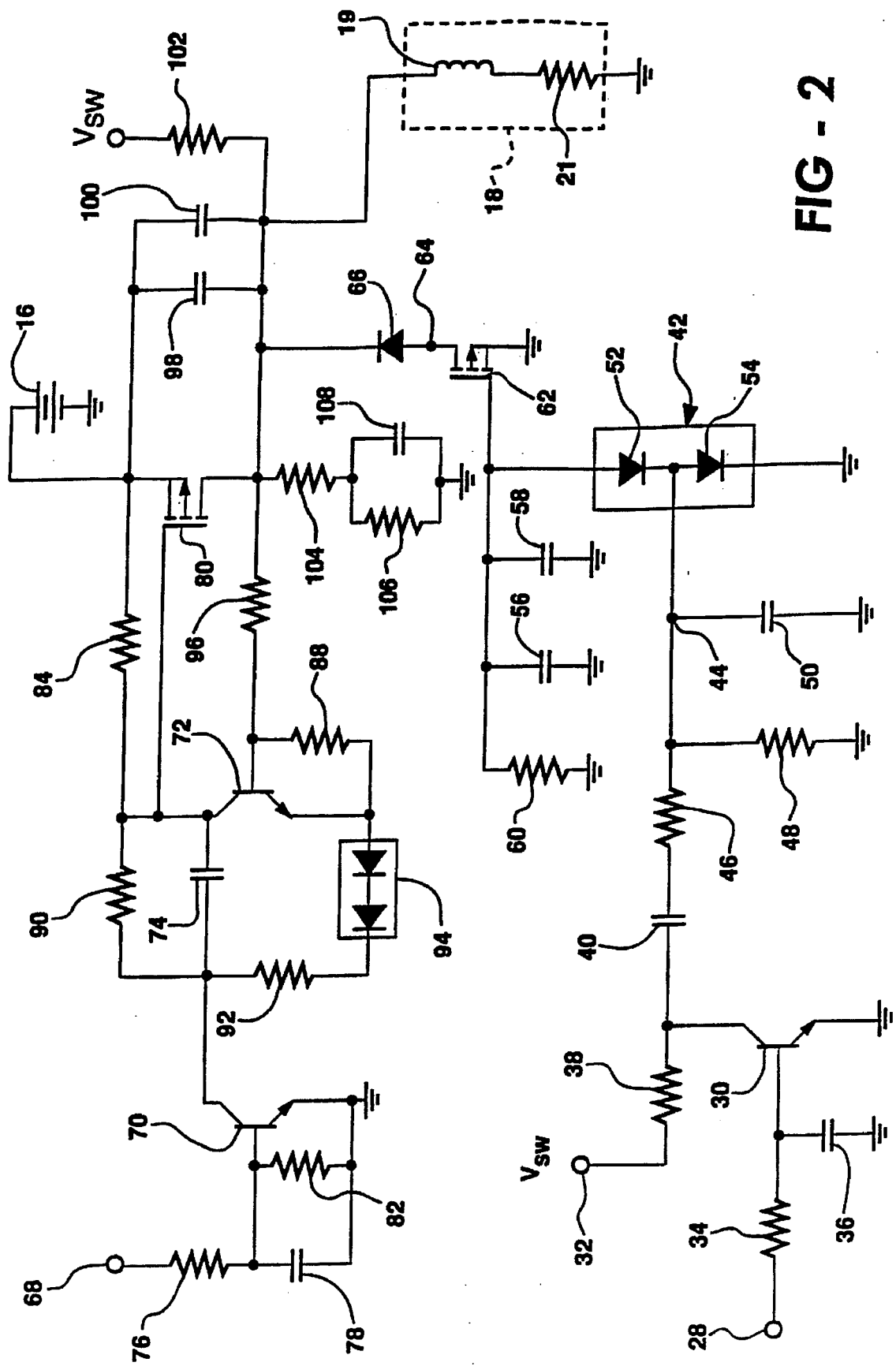
FIG. 2 is a schematic diagram of one embodiment of the present invention.

Referring FIGS. 1 and 2, the present invention, a clamping circuit, is generally shown at 10. The clamping circuit 10 is operatively connected between a control circuit 12, a driving circuit 14, a power source 16 and an output circuit 18. As may be seen by referring to FIG. 2, the output circuit 18 may include inductive elements, graphically represented at 19 and resistive elements, graphically represented at 21. The control circuit 12 includes at least one microprocessor (not shown) which produces at least one input signal receivable by both the clamping circuit 10 and the driving circuit 14. The driving circuit 14 is a common enhancement mode P channel FET configured as a high side output load driver. The driving circuit 14 is controlled by the signal received from the control circuit 12. It may be appreciated by those skilled in the art that other types of driving circuits may be used. A more detailed description of the driving circuit 14 is discussed subsequently.

The power source 16 is an automotive battery which is removable from the driving circuit 14. The battery 16 may be removed for repairs or for replacement wherein it will be necessary to reconnect a battery 16 to the driving circuit 14. It is at this time that the battery 16 may be connected to the driving circuit 14 incorrectly, i.e., the terminals may be reversed and connected to the incorrect poles.

The driving circuit 14 and the output circuit 18 may be any number of power circuits used to operate the electrical components of an automotive vehicle, such as a solenoid (not shown). Although only one of each is shown, it may be appreciated by those skilled in the art that a plurality of output circuits may be connected to the driving circuit 14, depending upon the particular requirements of the automotive vehicle.

The clamping circuit 10 includes an inductive flyback circuit 20. The inductive flyback circuit allows current to flow to the output circuit 18 through the driving circuit 14. The inductive flyback circuit 20 operates similarly to other inductive flyback circuits by providing a path for current where the inductor maintains the current through the rest of the circuit. In the embodiment shown, the inductive component is a part of the output circuit 18.

The clamping circuit 10 further includes a reverse power protection circuit 26. The reverse power protection circuit 26 is operatively connected between the inductive flyback circuit 20 and the control circuit 12. The reverse power protection circuit 26 opens the inductive flyback circuit 20 and provides an electrical connection between the power source 16 and the output circuit 18 preventing current to flow through the flyback circuit 20 when the power source 16 is connected to the driving circuit 14 incorrectly, e.g., in reverse polarity. The reverse power protection circuit 26 eliminates the requirement of a reverse voltage blocking diode which consumes power and disables the driving circuit 14 when the battery 16 is connected to the driving circuit 14 incorrectly.

Referring to FIG. 2, an input terminal 28 receives a signal from the control circuit 12. In one embodiment, the signal is a square wave generated when the power source 16 is applied to the control circuit 12 (connection not shown) in normal operating conditions. The square wave is buffered by a first transistor 30 to become square wave with a minimum voltage value of zero (0) volts and a maximum voltage value of $V_{sw}$. $V_{sw}$ is applied at a second input terminal 32 and it is a signal from a DC voltage source (not shown). This voltage source provides a voltage signal between zero (0) volts and twenty four (24) volts. The voltage signal is clamped and filtered to keep $V_{sw}$ stable in the presence of transients. A first resistor 34 and a first capacitor 36 are connected to the base of the first transistor 30 and couple the input terminal 28 thereto. The first resistor 34 is also connected to the input terminal 28 whereas the first capacitor 36 is also connected to ground. A second resistor 38 is connected between the collector of the first transistor 30 and the second input terminal 32.

When the first transistor 30 is turned on and off, an AC wave is created and passed through a second capacitor 40. A first diode assembly, generally shown at 42, acts as a rectifier and clamps the voltage at node 44 to a maximum voltage of +0.7 volts and a minimum of approximately $-V_{sw}$. A third resistor 46 reduces the in-rush current into the first transistor 30 when the first transistor 30 is turned on. A fourth resistor 48 discharges a voltage stored by a capacitor 50 when the first transistor 30 is turned off. Both the fourth resistor 48 and the capacitor 50 are connected to the third resistor 46, at node 44, and ground. The third resistor 46 is also connected to the second capacitor 40. The second capacitor 40 prevents high radio frequency interference when the polarity across the first diode assembly 42 changes. The first diode assembly 42 includes a first diode 52 and a second 54 diode, both of which are connected to the node 44. The second diode 54 is also connected to ground. The first diode 52 is connected to a third capacitor 56, a fourth capacitor 58 and a fifth resistor 60, all three of which are also connected to ground. The third capacitor 56 and the fourth capacitor 58 are used to store a negative charge generated from the square wave received from the input terminal 28. The third 56 and fourth 58 capacitors make a generous charge well to avoid a charge bleed due to humidity or moisture. The fifth resistor 60 discharges the third 56 and fourth 58 capacitors when the present invention 10 is turned off or otherwise disabled.

During a reverse battery fault condition, the charge stored in the third 56 and fourth 58 capacitors will reduce to zero (0) volts. A second transistor 62, the flyback transistor includes a gate which is connected to the third capacitor 56, the fourth capacitor 58 and the fifth resistor 60. The gate will stop conducting current when it is reduced to a zero (0) volt level. During normal operation, the gate of the second transistor 62 will be approximately $-(V_{sw}-5\text{ volts})$ allowing the second transistor 62 to conduct current. The source of the second transistor 62 is connected to a flyback node 64. The drain of the second transistor 62 is connected to ground. The flyback node 64 is connected to an inductive flyback diode 66 of a high side switched circuit. It may be appreciated by those skilled in the art that more than one inductive flyback diode may be used in the circuit. During the inductive flyback phase, current will be drawn through the second transistor 62 and the inductive flyback diode 66 clamping the output transients voltage to a desired value.

A third input terminal 68 also receives a signal from the control circuit 12. When the signal is high, a logic one (1), a third transistor 70 is turned on. This provides a single boot strap pulse to the gate of a fourth transistor 80 through a sixth capacitor A sixth resistor 76 and a seventh capacitor 78 control the rising and falling edges of the output of the third transistor 70. The sixth resistor 76 is connected to the third input terminal 68, the seventh capacitor 78, and the base of the third transistor 70. The seventh capacitor 78 is also connected to a seventh resistor 82 and ground. The seventh resistor 82 is connected to the emitter and base of the third transistor 70.

A short circuit time period that the fourth transistor 80 will be passing a maximum current is controlled by the sixth capacitor 74 and an eighth resistor 84. If the output is unable to achieve approximately seven (7) volts, or fifty percent (50%) of the power source 16 within the time period, the output will remain off. If the output exceeds seven (7) volts, the fifth transistor 72 will latch the fourth transistor 80 on. The gate voltage during the on state is controlled by a ninth resistor 88, a tenth resistor 90, an eleventh resistor 92, the eighth resistor 84, a second diode assembly 94, and a twelfth resistor 96. The second diode assembly 94 prevents high voltage spikes from passing through to the output load 18 through the path created by elements the eighth resistor 84, the tenth resistor 90, the eleventh resistor 92, the ninth resistor 88, and a twelfth resistor 96.

An eighth capacitor 98 protects the circuit from electrostatic discharge and provides an additional dV/dt slew rate control. A ninth capacitor 100 is connected in parallel to the eighth capacitor 98. The tenth resistor 90 is used to discharge the sixth capacitor 74 when the output circuit 18 is instructed by the control circuit 12 to be off. The inductive flyback diode 66 provides flyback transient clamping by using the flyback node 64 as a current source. A thirteenth resistor 102 pulls the output voltage high when the input to the first gain stage is low, for the off state, and the output load is missing. The thirteenth resistor 102 is connected between $V_{sw}$, and the eighth capacitor 98.

A fourteenth resistor 104 is connected to the fourth transistor 80, a fifteenth resistor 106, and a tenth capacitor 108. This node provides a feedback signal for the control circuit 12. The fifteenth resistor 106 and the tenth capacitor 108 are also connected to ground.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A clamping circuit for protecting circuits operatively connected between a control circuit, a driving circuit, a power source and an output circuit, said clamping circuit comprising:

an inductive flyback circuit to add current to the output circuit through the driving circuit; and a reverse power protection circuit operatively connected between said inductive flyback circuit and the control circuit, said reverse power protection circuit opening said inductive flyback circuit and providing an electrical connection between the power source and the output circuit allowing current to flow through the output circuit when the power source is connected to the driving circuit incorrectly.

2. A clamping circuit as set forth in claim 1 wherein said reverse power protection circuit includes a rectifier.

3. A clamping circuit as set forth in claim 1 including a capacitor electrically connected to the control circuit and operatively connected to said first diode and said second diode.

4. A clamping circuit as set forth in claim 1 wherein said inductive flyback circuit includes a flyback transistor.

5. A clamping circuit as set forth in claim 4 wherein said flyback transistor includes a gate electrically connected to said reverse power protection circuit.

6. A clamping circuit as set forth in claim 4 including a flyback diode electrically connected to the output circuit.

7. A clamping circuit as set forth in claim 6 wherein said flyback diode is electrically connected to said flyback transistor.

8. A clamping circuit for protecting circuits operatively connected between a control circuit, a driving circuit, a power source and an output circuit, said clamping circuit comprising:

an inductive flyback circuit to add current to the output circuit through the driving circuit; and a reverse power protection circuit operatively connected between said inductive flyback circuit and the control circuit, said reverse power protection circuit including a rectifier, said rectifier including a first diode and a second diode, said reverse power protection circuit opening said inductive flyback circuit and providing an electrical connection between the power source and the output circuit allowing current to flow through the output circuit when the power source is connected to the driving circuit incorrectly.

* * * * *